United States Patent
Gaeth et al.

[15] 3,640,837
[45] Feb. 8, 1972

[54] THERMALLY INSULATING TRANSPARENT LAMINATED GLASS WITH ALKALI METAL SILICATE INTERLAYER

[72] Inventors: Rudolf Gaeth, Limburgerhof; Fritz Stastny, Ludwigshafen; Rudolf Breu, Lambsheim; Friedhelm Gaertner, Frankenthal, all of Germany

[73] Assignee: Badische Anilin-& Soda-Fabrik Aktiengesellschaft, Ludwigshafen (rhine) Germany

[22] Filed: Dec. 30, 1969

[21] Appl. No.: 889,299

[30] Foreign Application Priority Data

Jan. 2, 1969 Germany .......................P 19 00 054.5

[52] U.S. Cl..............................161/165, 161/193, 161/206, 161/208, 161/403
[51] Int. Cl.........................................................B32b 17/06

[58] Field of Search...................161/193, 208, 206, 403, 165; 106/74, 75; 156/99, 106

[56] References Cited

UNITED STATES PATENTS

| | | | |
|---|---|---|---|
| 2,006,348 | 7/1935 | Fix et al. | 161/193 |
| 2,009,441 | 7/1935 | Fix et al. | 161/193 |
| 2,072,583 | 3/1937 | Fix et al. | 161/193 |
| 3,184,371 | 5/1965 | Seidl | 161/193 |
| 3,268,350 | 8/1966 | Grebe et al. | 106/75 |

*Primary Examiner*—John T. Goolkasian
*Assistant Examiner*—D. J. Fritsch
*Attorney*—Johnston, Root, O'Keeffe, Keil, Thompson & Shurtleff

[57] ABSTRACT

Thermally insulating and transparent laminated glass consisting of at least two superimposed sheets of glass with an interlayer of a solid aqueous alkali metal silicate between each two sheets of glass.

4 Claims, No Drawings

THERMALLY INSULATING TRANSPARENT LAMINATED GLASS WITH ALKALI METAL SILICATE INTERLAYER

It is known that glass has little resistance to the action of heat and flame and cracks after only a short time. Quartz glass has more favorable properties in this respect but like ordinary glass it has a high thermal conductivity so that after only a short time such high temperatures occur on the side not exposed to heat that combustible materials in the vicinity may be ignited by radiation or convection. The known wired glass in which wire mesh is embedded as reinforcement also has a high thermal conductivity. This glass also cracks under the action of heat but has the advantage that the individual fragments are held together by the wire mesh so that flame and gas can only penetrate with difficulty if at all.

Laminated glass which is resistant to the action of heat and flames, thermally insulating and at the same time transparent or translucent has not hitherto been known.

We have now found that this combination of properties, hitherto unknown but of considerable interest for fire protection, is exhibited by a laminated glass which consists of at least two superimposed sheets of glass with an interlayer of a solid alkali metal silicate containing water between the glass sheets.

When laminated glass in accordance with this invention is exposed to the action of heat or flames, the sheet exposed to the action of heat cracks while the alkali metal silicate interlayer expands with the boiling off of the water contained in it to form a foam layer which provides an effective barrier to the passage of heat.

The aqueous alkali metal silicate layer, which preferably consists of sodium silicate, advantageously has a water content of from 10 to 40 percent, preferably from 25 to 35 percent, by weight. The thickness of the layer depends largely on the desired action and the number of sheets of glass in the assembly. The thickness of the alkali metal silicate layer can usually be smaller the greater the number of sheets of glass which is to be combined together, but advantageously should not be less than 0.3 mm. and as a rule should not be more than 10 mm. The thickness of an individual layer is advantageously from 1 to 5 mm. In a combination of two glass sheets, the thickness will be in the neighborhood of the upper limit and in the case of assemblies having more than two sheets an appropriately smaller thickness will be chosen.

To increase the mechanical stability of the assembly, in particular when it has large dimensions, it is advantageous to provide reinforcement, for example wire mesh and/or glass fibers, in the alkali metal silicate layer. Glass fibers, particularly chopped strands, may be used for example in amounts of from 0.5 to 30 percent, preferably in amounts of from 1 to 15 percent, by weight in the alkali metal silicate layer. The alkali metal silicate layers may also contain fillers, for example glass powder. Naturally it is also possible to use sheets of wired glass instead of ordinary glass.

Laminated glass according to the invention may be made in a simple manner by applying an aqueous alkali metal silicate solution to a horizontal sheet of glass provided with a frame around its edges and then removing water from the solution by the action of elevated temperatures so that the liquid layer solidifies. It is advantageous for the temperature within the layer not to exceed from about 105° to 130° C. because otherwise the layer expands. After solidification of the layer it is combined with another sheet of glass or with a sheet of transparent plastics, for example of rigid polyvinyl chloride or a polymethacrylate, for example by bonding with an adhesive. Further layers of silicate may be applied in a similar manner to the laminate thus prepared and covered with sheets of glass or transparent plastics. A suitable adhesive is for example a waterglass solution having a commercial concentration or a mixture of talc with a 35 to 48 percent by weight waterglass solution in the ratio by weight of from 1:2 to 1:3 with reference to the total weight, or epoxide resin mixtures containing silicon compounds having the general formula $(H_2NR)_n SiX_{4-n}$ where $n$ denotes an integer from 1 to 3, R denotes a nonpolar radical, for example an aliphatic or aromatic hydrocarbon radical, and X denotes a polar group, for example an alkoxy, aroxy, hydroxyl or carboxyl radical, as an adhesion promoter. Aliphatic radicals having one to 10 carbon atoms are particularly suitable as nonpolar radicals. Reaction products of epichlorohydrin with polyphenols, for example diphenylolpropane, or with aliphatic polyols, for example pentaerythritol, which have been cured with polyfunctional amines or polycarboxylic acid anhydrides, are suitable as epoxide resins.

Production of the laminated glass according to the invention can be carried out in a particularly economical manner in combination with the production of glass sheeting by applying the alkali metal silicate solution to the glass sheets while the sheets still have a temperature of from about 100° to 150° C. so that their heat content is utilized for evaporating the water.

By using alkali metal silicate solutions in the production of the laminated glass according to this invention, substantially glass-clear layers are obtained. To accelerate the solidification process, it is naturally also possible to use suspensions consisting of particles of solid alkali metal silicate still containing water which are suspended in an aqueous alkali metal silicate solution. In this case milky but still translucent structures are obtained rather than transparent ones.

It is also possible to prepare laminated glass by bonding a sheet of glass on either side of a prefabricated sheet of alkali metal silicate.

In order that the good insulating properties of the laminated glass according to this invention may be fully realized, the assembly is advantageously fitted into a frame of noncombustible, thermally insulating material.

The invention is illustrated by the following example.

EXAMPLE

Laminated sheets according to the invention having varying thicknesses of sodium silicate are set out below under numbers 2 to 8. The sodium silicate in each case has a ratio of $Na_2O:SiO_2$ of 1:3.3 and a water content of 28 percent by weight. The sheet under number 1 is wired glass with a thickness equal to that of the glass under numbers 2 and 3.

To test the thermal insulating power of the sheets they are exposed to a flame on one side in a fire chamber using the temperature profile according to DIN 4102, sheet 2 (Sept. 1965) and the rise in temperature of the surface not exposed to flame is measured in dependence on time. The results are given in the following table in which the last three columns give the time in minutes which elapses before a temperature rise of 140°, 350° and 500° C. is measured.

| Composition of test specimen | Temperature rise °C. | | |
|---|---|---|---|
| | 140 | 350 | 500 |
| 1. Wired glass (7.3 mm.) | 5 | 10 | 15 |
| 2. Glass sheet (2.8 mm.) | | | |
| Layer of sodium silicate (1.7 mm.) | 20 | 40 | 60 |
| glass sheet (2.8 mm.) | | | |
| 3. Glass sheet (2.8 mm.) | | | |
| Layer of sodium silicate (1.7 mm.) | | | |
| (with 140 g./sq.m. glass fibers, wire mesh (wire 0.5-mm. thick) 50 g./sq.m. cane sugar) | 25 | 45 | 90 |
| Glass sheet (2.8 mm.) | | | |
| 4. Glass sheet (2.8 mm.) | | | |
| Layer of sodium silicate (0.5 mm.) | 13 | 23 | 35 |
| Glass sheet (2.8 mm.) | | | |
| 5. Glass sheet (2.8 mm.) | | | |
| Layer of sodium silicate (0.3 mm.) | | | |
| Glass sheet (2.8 mm.) | 17 | 40 | — |
| Layer of sodium silicate (0.3 mm.) | | | |
| Glass sheet (2.8 mm.) | | | |
| 6. Glass sheet (2.8 mm.) | | | |
| Layer of sodium silicate (3.4 mm.) | | | |
| (with 200 g./sq.m. glass fibers, wire mesh and 100 g./sq.m. cane | | | |

|   |   |   |   |
|---|---|---|---|
| sugar) Glass sheet (2.8 mm.) | 38 | 85 | — |
| 7. Two of No. 3 with an airgap of 15 mm. between them | 65 | 100 | — |
| 8. Glass sheet (2.8 mm.) Layer of sodium silicate (1.7 mm.) Rigid polyvinyl chloride (2 mm.) | 19 | 67⁺ | — |

⁺ Exposure to the flame on the polyvinyl chloride side.

We claim:

1. A thermally insulating and transparent structure consisting essentially of at least two superimposed sheets of glass, and between each two sheets of glass, an interlayer of solid aqueous alkali metal silicate containing from 10 to 40 percent by weight of water and having a thickness of from 0.3 to 10 mm.

2. A laminated glass as in claim 1 wherein each interlayer has a thickness of from 1 to 5 mm.

3. A laminated glass as in claim 1 wherein at least one sheet of glass is replaced by a sheet of transparent plastics.

4. A laminated glass as in claim 1 wherein the alkali metal silicate contains from 25 to 35 percent by weight of water.

* * * * *